United States Patent
Davis et al.

(10) Patent No.: US 10,543,730 B2
(45) Date of Patent: Jan. 28, 2020

(54) AUXILIARY SUSPENSION AIR DAMPING SYSTEMS AND ASSOCIATED METHODS OF MANUFACTURE AND USE

(71) Applicant: Link Mfg., Ltd., Sioux Center, IA (US)

(72) Inventors: Tye B. Davis, Grand Meadow, MN (US); Joel D. Van Den Brink, Rock Valley, IA (US); Gregory W. Hulstein, Sioux Center, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 66 days.

(21) Appl. No.: 15/890,066

(22) Filed: Feb. 6, 2018

(65) Prior Publication Data

US 2018/0222274 A1    Aug. 9, 2018

Related U.S. Application Data

(60) Provisional application No. 62/456,566, filed on Feb. 8, 2017.

(51) Int. Cl.
*B60G 13/14* (2006.01)
*B60G 17/04* (2006.01)
(Continued)

(52) U.S. Cl.
CPC ........... *B60G 17/0408* (2013.01); *B60G 9/00* (2013.01); *B60G 11/27* (2013.01); *B60G 13/10* (2013.01);
(Continued)

(58) Field of Classification Search
CPC ...... B60G 17/0408; B60G 13/10; B60G 9/00; B60G 13/14; B60G 17/056; B60G 1/27;
(Continued)

(56) References Cited

U.S. PATENT DOCUMENTS

| 3,895,818 A | 7/1975 | Fearon |
| 4,382,604 A * | 5/1983 | Nakagawa ............... B60G 9/02 |
| | | 280/124.112 |

(Continued)

FOREIGN PATENT DOCUMENTS

| EP | 0867315 A2 * | 9/1998 | ........... B60G 17/005 |
| WO | 2006071172 A1 | 7/2006 | |
| WO | 2006093458 A1 | 9/2006 | |

OTHER PUBLICATIONS

European Search Report and Opinion dated Jul. 2, 2018; European Patent Application No. 18155689.5; 14 pages.

(Continued)

*Primary Examiner* — Karen Beck
(74) *Attorney, Agent, or Firm* — Perkins Coie LLP

(57) ABSTRACT

Air damping systems for lift axles are described herein. In some embodiments, lift axle systems configured in accordance with the present technology can include one or more air springs for carrying vehicle sprung mass ("load springs") and one or more air springs (or, for example, air cylinders) for raising the lift axle ("lift springs"). One or more air lines can be connected between the load springs and the lift springs so that, in operation, compression and extension of the load springs in response to axle movement causes pressurized air to flow back and forth between the load springs and the lift springs. As a result, the lift springs provide an additional volume to receive the pressurized air and provide an opposing spring force to the suspension. Additionally, in some embodiments the air line or lines extending between the load springs and the lift springs can include an air flow restriction and/or other air damping feature. In operation, the air damping feature dampens the flow of air between the load springs and the lift springs to provide damping of the vehicle suspension without the additional costs or disadvantages often associated with conventional hydraulic shock absorbers.

19 Claims, 9 Drawing Sheets

(51) Int. Cl.
  *B60G 11/27* (2006.01)
  *B60G 17/056* (2006.01)
  *B60G 9/00* (2006.01)
  *B60G 13/10* (2006.01)
  *F16F 9/512* (2006.01)
  *B60G 17/052* (2006.01)

(52) U.S. Cl.
  CPC ........... *B60G 13/14* (2013.01); *B60G 17/056* (2013.01); *B60G 17/04* (2013.01); *B60G 17/0523* (2013.01); *B60G 17/0525* (2013.01); *B60G 2202/152* (2013.01); *B60G 2202/412* (2013.01); *B60G 2204/4702* (2013.01); *B60G 2206/40* (2013.01); *B60G 2300/402* (2013.01); *F16F 9/512* (2013.01)

(58) Field of Classification Search
  CPC .............. B60G 17/04; B60G 17/0523; B60G 17/0525; B60G 2204/4702; B60G 2202/152; B60G 2300/402; B60G 2202/412; B60G 2206/40; F16F 9/512
  See application file for complete search history.

(56) References Cited

U.S. PATENT DOCUMENTS

| | | | |
|---|---|---|---|
| 4,390,187 A * | 6/1983 | Maeda | B60G 17/0155 267/64.22 |
| 4,934,667 A | 6/1990 | Pees et al. | |
| 5,403,031 A | 4/1995 | Gottschalk et al. | |
| 6,311,993 B1 | 11/2001 | Hulstein et al. | |
| 6,416,069 B1 * | 7/2002 | Ramsey | B60G 11/27 280/124.116 |
| 6,845,989 B2 | 1/2005 | Fulton et al. | |
| 6,880,839 B2 | 4/2005 | Keeler et al. | |
| 7,735,516 B2 | 6/2010 | Morris et al. | |
| 9,139,061 B2 | 9/2015 | Delorenzis | |
| 9,157,529 B2 | 10/2015 | Westnedge et al. | |
| 9,290,221 B2 | 3/2016 | Conaway et al. | |
| 9,352,628 B2 | 5/2016 | Barton et al. | |
| 9,481,416 B2 | 11/2016 | Conaway et al. | |
| 2003/0111810 A1 * | 6/2003 | Fulton | B60G 11/27 280/86.5 |
| 2003/0151222 A1 * | 8/2003 | Sutton | B62D 61/125 280/86.5 |
| 2008/0185549 A1 * | 8/2008 | Steinbuchel | B60G 9/00 251/205 |
| 2009/0200718 A1 | 8/2009 | Roemer et al. | |
| 2017/0225729 A1 * | 8/2017 | Yakimishyn | B62D 61/125 |
| 2018/0222274 A1 * | 8/2018 | Davis | B60G 9/00 |
| 2019/0061847 A1 * | 2/2019 | Barton | B62D 61/125 |
| 2019/0077468 A1 * | 3/2019 | Hulstein | B62D 33/077 |

OTHER PUBLICATIONS

Link Manufacturing Ltd., Air Control Kit (1350-1004), Installation Instructions Parts List; Jan. 14, 2016, 4 pages.

\* cited by examiner

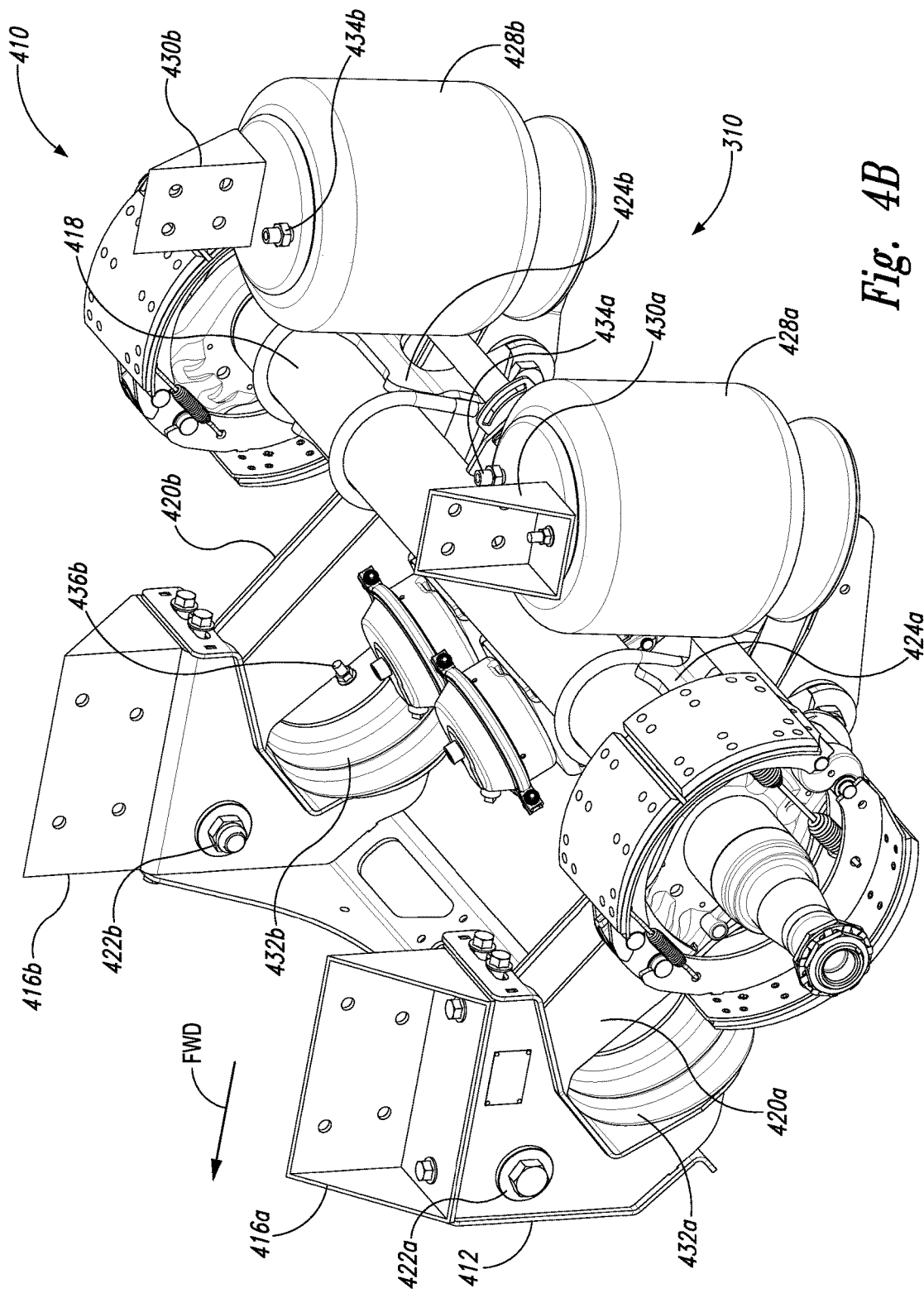

AUXILIARY SUSPENSION AIR DAMPING SYSTEMS AND ASSOCIATED METHODS OF MANUFACTURE AND USE

CROSS-REFERENCE TO RELATED APPLICATION INCORPORATED BY REFERENCE

The present application claims the benefit of and priority to U.S. Provisional Patent Application No. 62/456,566, filed Feb. 8, 2017, and titled "AUXILIARY SUSPENSION AIR DAMPING SYSTEMS AND ASSOCIATED METHODS OF MANUFACTURE AND USE", the disclosure of which is incorporated herein by reference in its entirety.

TECHNICAL FIELD

The present disclosure is directed generally to auxiliary suspension systems and, more particularly, to lift axle damping systems.

BACKGROUND

Many trucks carry loads that vary greatly due to the loading and unloading of cargo. To carry the full range of loads, some trucks use one or more non-drive rear axles in conjunction with one or more drive axles. The auxiliary non-drive rear axles may be needed for a variety of reasons, including compliance with bridge laws, truck suspension and tire ratings, etc. In the unloaded condition, the non-drive axles are just "along for the ride," since they are not needed to carry any load in that condition. For this reason, many trucks utilize non-drive axles that can be lifted off of the ground and into to a stored position (the "lifted position" or "raised position") when not needed. These axles are generally referred to as "lift axles" or "liftable axles." By raising the lift axle when the vehicle is lightly loaded, wear on the lift axle tires can be reduced and fuel economy can be increased due to the absence of rolling resistance from the lift axle tires.

Lift axles can be installed ahead of or behind the drive axles on a straight truck or tractor. If a lift axle is positioned ahead of the drive axle, the lift axle is referred to as a "pusher." If the lift axle is positioned behind the drive axle, it is referred to as a "tag." Lift axles can also be installed ahead of or behind an axle or tandem axles on an articulating trailer. There are both steerable and non-steerable lift axles. As the name implies, the wheels on non-steerable lift axles cannot turn, and as a result non-steerable lift axles need to be raised prior to turning a tight corner or the tires will scuff and impose high lateral stresses on the wheels and other chassis components. Steerable lift axles include wheels that caster so they can remain in contact with the ground during tight turning.

When a lift axle is in the lowered or active position, the load on the lift axle (commonly referred to as "sprung mass") is typically carried by one or more "load springs." The load springs are often air springs, which typically include flexible bellows that form an air chamber that is inflated to extend the spring and carry the load. Many lift axles also employ additional air springs (commonly referred to as "lift springs" or "lift bags") to lift the axle when the vehicle is in the unloaded or lightly loaded condition. In existing lift axle systems, the lift springs and the load springs are not inflated at the same time. Instead, only one of the two spring sets, either the lift springs or the load springs, is fully inflated at any given time depending on the state of the lift axle. Various lift axle systems are described in U.S. Pat. No. 5,403,031 to Gottschalk et al., U.S. Pat. No. 6,311,993 to Hulstein et al., U.S. Pat. No. 6,880,839 to Keeler et al., and U.S. Pat. No. 9,352,628 to Barton et al., each of which is incorporated herein by reference in its entirety.

BRIEF DESCRIPTION OF THE DRAWINGS

FIG. 4B is an isometric view, and of an air damped lift axle system configured in accordance with an embodiment of the present technology.

DETAILED DESCRIPTION

Figure 1:
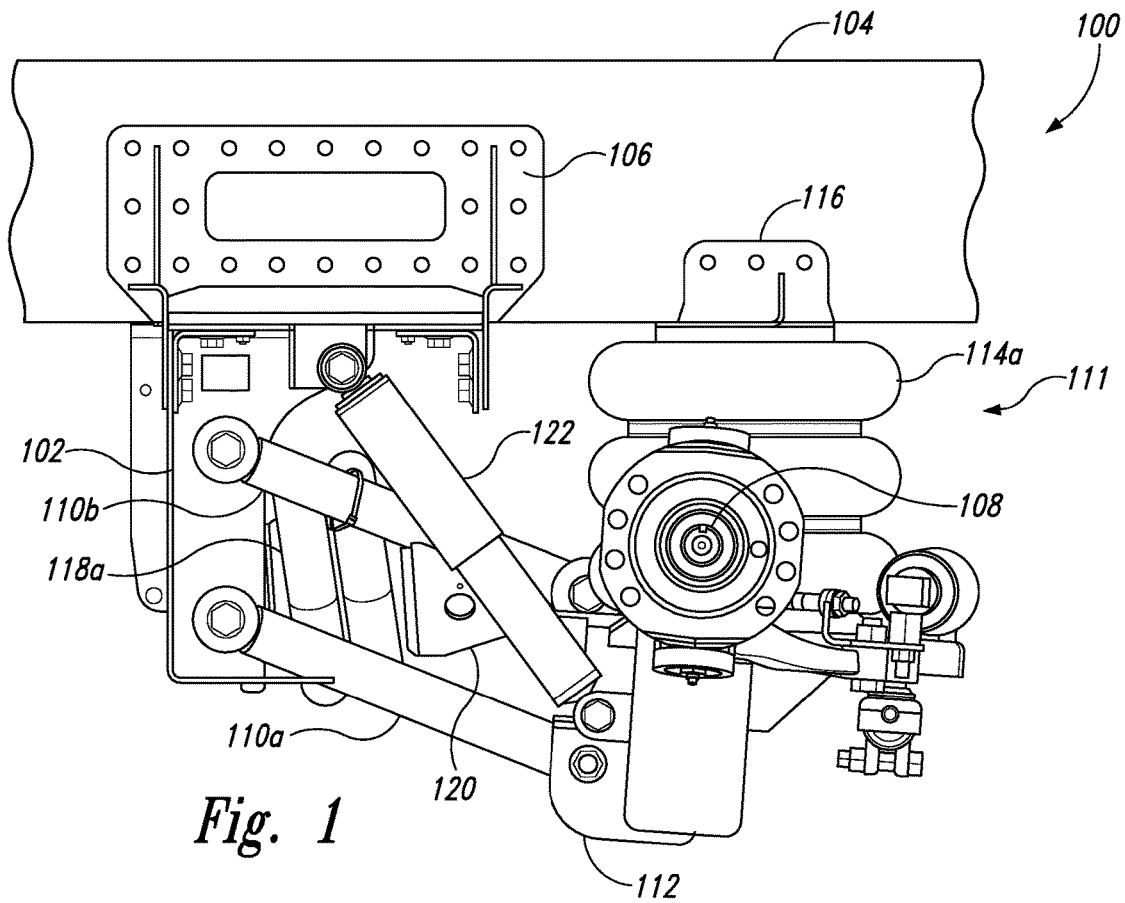
FIG. 1 is a side view of a lift axle system with a hydraulic shock absorber.

The following disclosure describes various embodiments of air damping systems, components, and associated methods for use with lift axles on heavy duty trucks, trailers, and/or other vehicles. In some embodiments, lift axle systems configured in accordance with the present technology include one or more air springs for carrying vehicle loads ("load springs") that are pneumatically connected to one or more air springs or other air-driven lift actuators for raising the lift axle ("lift springs"). When the lift axle is in the lowered position, both the load springs and the lift springs are inflated, and pressurized air flows back and forth between the load spring and lift spring chambers in response to up and down movement of the axle. The pneumatic connection between the two chambers enables the spring force from the lift springs to work in conjunction with the spring force from the load springs in responding to movement of the suspension. The lift axle systems described herein can also include a flow restriction or other damping feature in the conduit pneumatically connecting the load springs to the lift springs. As air transfers back and forth between the respective chambers, the flow restriction dampens the flow which in turn dampens the corresponding motion of the axle. In some embodiments of the present technology, the combination of the additional spring force provided by the lift springs and the air damping provided by the flow restriction can provide a highly tunable suspension system that can control motion better than conventional suspension systems utilizing independent air damping.

Although some embodiments of the lift axle systems described herein utilize air springs as lift springs to raise the lift axle, other embodiments of the present technology include other types of pressurized air-driven lift actuators capable of extending to raise the lift axle and contracting for lowering of the list axle. For example, in some embodiments an air cylinder in which a piston is driven by pressurized air can be used to raise the lift axle, and the pressure chamber of the load spring can be pneumatically connected to the pressure chamber of the air cylinder with a flow restriction or other damping feature positioned therebetween to provide the favorable suspension damping characteristics described herein.

Embodiments of the present technology also include an air supply system configured to selectively provide pressurized air from, e.g., a vehicle compressed air source to the load springs and the lift springs in the manner described above. As described in greater detail below, in some embodiments the air supply system includes two valves that pass pressurized air to the lift springs when it is desired to lift the axle to the raised position. For movement to the raised position, the load springs are de-pressurized completely, or to a low enough pressure, such that the axle is able to rise by the force of the lift springs. When it is desired to deploy the suspension to the lowered position, the air supply system provides pressurized air from the vehicle air system to the load springs and the lift springs at the same static pressure, or at least approximately the same static pressure. The load springs can be configured (by, for example, having a larger cross-sectional diameter) to provide greater force than the lift springs, and/or the load springs can be positioned to have a mechanical advantage over the lift springs, so that upon inflation of the lift springs and the load springs at the same static pressure, the load springs overcome the lift springs and drive the suspension downward into the lowered position. As described above, the load springs can be pneumatically connected to the lift springs so that pressurized air will transfer back and forth between the load springs and the lift springs in response to axle movement, and the axle movement can be dampened by, for example, partially restricting the airflow between the two chambers by one or more of the means described herein.

Certain details are set forth in the following description and in FIGS. 1-8 to provide a thorough understanding of various embodiments of the present technology. In other instances, well-known structures, systems, materials and/or operations often associated with lift axles, air suspension systems and associated components, heavy duty trucks and other vehicles, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a side view of a conventional lift axle system 100 in the lowered (deployed or active) position. A number of components normally found on such axle systems, including wheels, hubs, hardware brackets, etc. have been omitted from FIG. 1 for purposes of clarity. Additionally, those of ordinary skill in the art will recognize that FIG. 1 only shows one side (i.e., the driver side) of the lift axle system 100, and the lift axle system 100 includes a similar arrangement of components on the opposite side of the vehicle (i.e., the passenger side).

The lift axle system 100 includes a lift axle 111 having an axle member 108 mounted to an axle bracket 112. The axle bracket 112 is pivotally coupled to a support structure 102 by means of lower and upper substantially parallel arms 110*a* and 110*b*, respectively. The support structure 102 is fixedly attached to two spaced apart, longitudinally extending vehicle frame members 104 by means of two brackets 106 (only one frame member 104 and corresponding bracket 106 are shown in FIG. 1). The lift axle 111 further includes a first air spring 114*a* (referred to herein as a "first load spring 114*a*") that operably extends between the axle bracket 112 and a mounting bracket 116 that fixedly attaches an upper end portion of the first load spring 114*a* to the respective frame member 104. Additionally, the lift axle 111 also includes a second air spring 118*a* (referred to herein as a "first lift spring 118*a*") that is operably coupled between the support structure 102 and a bracket 120 that is welded to the upper arm 110*b*. The lift axle 111 further includes a shock absorber 122, e.g., a conventional hydraulic shock absorber, that operably extends between the axle bracket 112 and the support structure 102 proximate the frame rail 104. Although not shown in FIG. 1, as noted above the lift axle 111 also includes a second set of parallel arms 110*a, b*, a second load spring 114*b*, a second lift spring 118*b*, and a second shock absorber 122 on the other side of the lift axle 111.

Figure 2A:
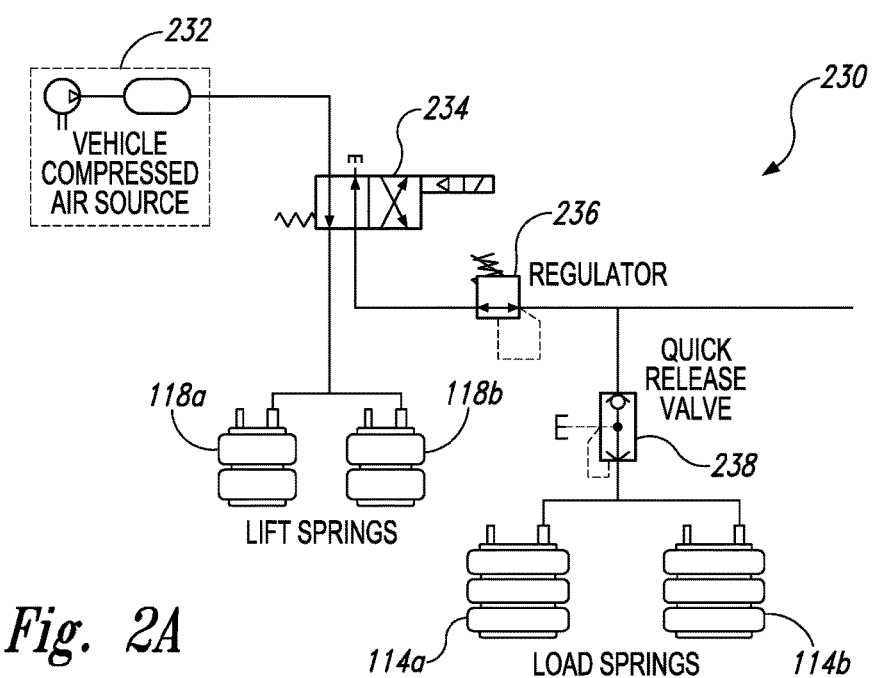
FIGS. 2A and 2B are schematic diagrams of a typical air control kit for raising and lowering the lift axle system of FIG. 1.
Figure 2B:
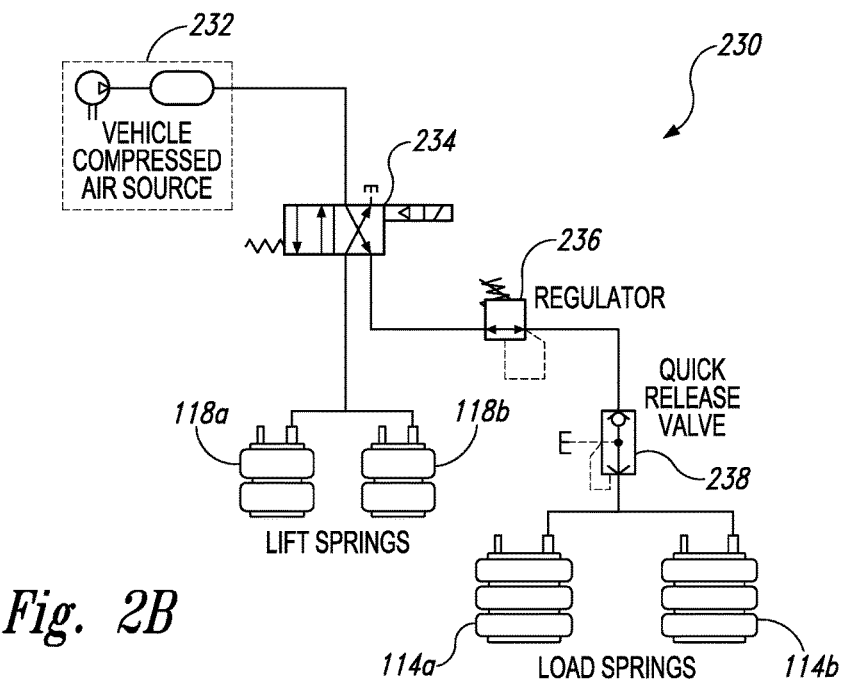

FIGS. 2A and 2B are partially schematic diagrams of a typical air control kit 230 ("air kit 230") that can be included with the lift axle system 100 for raising and lowering the lift axle 111 described above with reference to FIG. 1. The air kit 230 is one example of a typical air control kit for use with lift axles, such as the STANDARD AIR CONTROL KIT, Part No. 13501004, provided by Link Manufacturing, Ltd, Sioux Center, Iowa 51250. The air kit 230 includes a valve 234 that receives compressed air from a vehicle compressed air source 232. The valve 234 is a four port, two position valve, commonly abbreviated as a "4/2 valve," that is activated by an internal air pilot signal controlled by an electric solenoid (not shown). The electrical signal controlling the solenoid can come from a manual switch, such as a rocker-type switch, that can be activated by the vehicle operator to raise and lower the lift axle 111. In the de-energized state shown in FIG. 2A, the valve 234 provides compressed air to the lift springs 118a, b. In the energized state shown in FIG. 2B, the valve 234 provides pressurized air to the load springs 114a, b via a pressure regulator 236 and a quick release valve 238.

Referring to FIGS. 1 and 2A together, the vehicle compressed air source 232 provides air to the valve 234 at a pressure referred to herein as the "system pressure." In some embodiments, system pressure can range from about 115 psi to about 150 psi, depending on the vehicle's compressed air system. To raise the lift axle 111 from the lowered position shown in FIG. 1, the solenoid for the valve 234 is de-energized so that pressurized air at the system pressure flows from the vehicle compressed air source 232 and through the valve 234 to the lift springs 118a, b. Concurrently, air pressure in the conduit leading from the valve 234 to the pressure regulator 236 is exhausted through the valve 234. This causes a pressure drop in the conduit, which activates the quick release valve 238 and causes it to drain pressurized air from the load springs 114a, b. As the pressurized air from the compressed air source 232 flows into the lift springs 118a, b, they inflate and extend, thereby raising the lift axle 111 via counterclockwise rotation of the parallel arms 110a, b about the support structure 102 as shown in FIG. 1. Simultaneously, the air drains from the load springs 114a, b and they are compressed as the lift axle 111 retracts upwardly toward the frame members 104.

Referring next to FIGS. 1 and 2B together, to lower the lift axle 111 the valve 234 is energized so that air at system pressure passes from the compressed air source 232 through the valve 234 and to the pressure regulator 236. The pressure regulator 236 can be manually adjustable and set to a desired level referred to herein as the "regulated pressure." The regulated pressure is lower than the system pressure and typically set so that the primary suspension load on the lift axle 111 is under the rated load determined by the lift axle manufacturer. The regulated pressure can also be set so that the load on the lift axle 111 is approximately equal to the load on one or more adjacent vehicle axles. For example, in some embodiments the regulated pressure does not exceed 125 psi, and in other embodiments the regulated pressure does not exceed 100 psi, since many air springs are rated for these pressures. Air at the regulated pressure passes from the regulator 236 to the quick release valve 238. The quick release valve 238 can be a pilot air operated valve that permits the free flow of pressurized air from the regulator 236 to the load springs 114a, b. As the load springs 114a, b inflate and expand, the lift springs 118a, b deflate and compress as pressurized air in the lift springs 118a, b is exhausted through the valve 234. Expansion of the load springs 114a, b and corresponding contraction of the lift springs 118a, b causes the lift axle 111 to move downwardly and away from the frame members 104 toward the lowered position shown in FIG. 1.

In order to raise the lift axle wheels completely off the ground and provide sufficient clearance, lift axle systems must be able to travel through an operating range that is considerably longer than the normal operating range of non-lift axles without any interference. For example, a typical lift axle rated for, e.g., 13,500 pounds, may be configured to move approximately nine inches between the ride height (i.e., the position of the suspension when the vehicle is at rest and the lift axle is in the lowered position) and the lifted or raised position. By way of comparison, the distance between the ride height and the maximum compressed state of a non-lift axle suspension of similar size would be closer to three or four inches. As a result of the greater operating range of lift axles, it can be difficult to use conventional hydraulic shock absorbers with lift axle systems because such shock absorbers typically have a minimum compressed length due to their construction that is insufficient to accommodate the full range of travel necessary unless they are oriented at a substantial angle to the vertical direction. Because of the difficulties and the added costs associated with the use of shock absorbers and the associated mounting brackets, etc., many lift axle systems do not include shock absorbers.

When shock absorbers are used on lift axles, they are typically oriented at high angles relative to vertical to reduce compression and avoid reaching the minimum compressed length during raising of the lift axle. As shown in FIG. 1, for example, the shock absorber 122 is oriented at a relatively high angle off of vertical. This is not an ideal solution, however, because much of the damping force provided by the shock absorber 122 is not opposing the vertical motion of the suspension, and can create undesirable longitudinal forces between the lift axle 111 and the vehicle frame 104. As a result, it would be advantageous to provide a suitable damping system for use with lift axles that did not require the added costs and maintenance often associated with conventional shock absorbers.

Air damping is a technology that has existed for many years, although it has not been widely implemented in the automotive or heavy truck industries. In a typical air damper, air is transferred between a chamber under load (e.g., a compression chamber) and a secondary air volume. The air flow between the two volumes is typically restricted to cause a damping force that opposes the compression force. In most applications, the secondary air volume has no other purpose. Continental AG offers a unitary air spring/damper module that consists of two air chambers within the same housing. Hendrickson USA, L.L.C. provides a "Zero-Maintenance Damping (ZMD™)" product that uses a hollow air spring piston as the secondary air chamber. Such systems are described in, for example, U.S. Pat. No. 9,157,529 to Westnedge et al., which is incorporated herein in its entirety by reference. Other vehicle suspension systems that use remote reservoirs for air spring damping are described in U.S. Pat. No. 9,139,061 to Delorenzis, which is also incorporated herein in its entirety by reference.

In addition to the cost associated with conventional air damping systems, there are also disadvantages from a technical perspective. For example, it can be difficult to tune an air damped suspension system. In this context, tuning refers to the subjective or objective determination of optimum ride and handling characteristics of a given vehicle or vehicle application. In a typical suspension system having an air spring in combination with a hydraulic shock absorber, the spring rate and the damping characteristics are not dependent on each other, and the damping provided by the air spring itself is typically low enough to be negligible for practical purposes. This allows the air spring to be sized for static load carrying capability and ideal spring rate for the particular application. The tuning can then be isolated to the damping properties of the shock absorber in most cases. For an air damped suspension, however, the volume of the load spring, the volume of the secondary chamber, and the restriction between these two chambers all affect both the spring rate and the damping. As a result, in ride-sensitive applications, the interdependency of these factors can make it difficult to achieve the same level of damping performance as a suspension system using a conventional hydraulic shock absorber.

Figure 3:
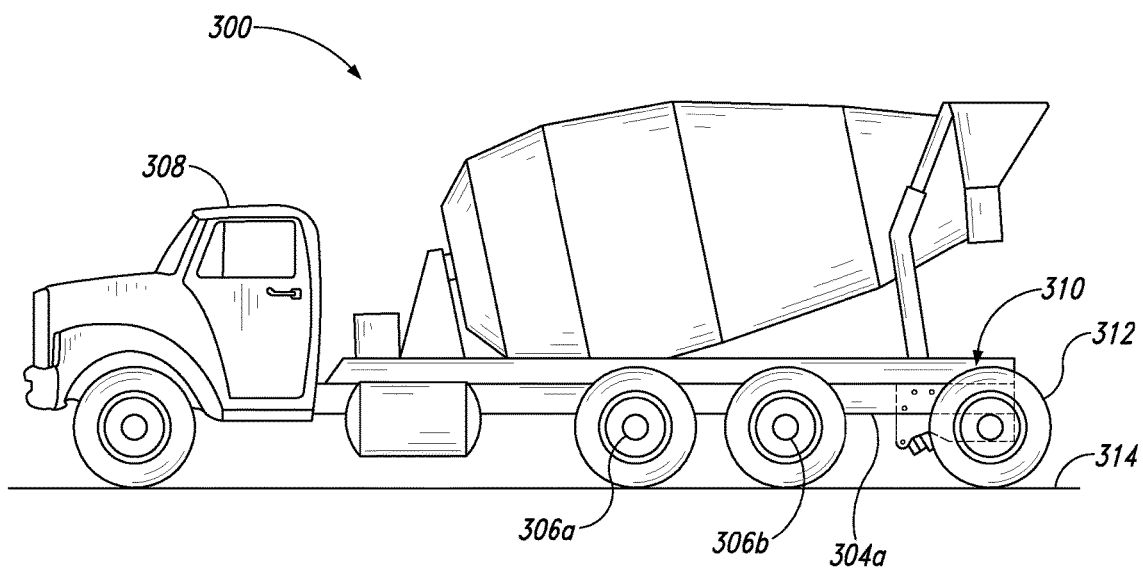
FIG. 3 is a side view of a vehicle having a lift axle system configured in accordance with an embodiment of the present technology.

FIG. 3 is a driver side view of a vehicle 300 having a lift axle system 310 configured in accordance with an embodiment of the present technology. In the illustrated embodiment, the lift axle system 310 is attached to two spaced-apart longitudinally extending frame members 304a, b behind tandem axles 306a and 306b in a "tag" configuration (only the first frame member 304a is shown in FIG. 3, but it will be understood that the vehicle 300 includes a second frame member 304b on the opposite side of the vehicle). One or both of the tandem axles 306a, b can be drive axles. In other embodiments, the lift axle system 310 can be positioned between a cab 308 and the tandem axles 306a, b in a "pusher" configuration. One or more wheels 312 can be rotatably mounted to opposite ends of the lift axle system 310. As described in greater detail below, in operation the lift axle system 310 can raise the wheels 312 off of the ground 314 when the lift axle is not in use, and lower the wheels 312 into contact with the ground 314 as shown when the extra support of the lift axle system 310 is desired. Although the vehicle 300 is depicted as a concrete mixer for purposes of the illustration, the lift axle systems described herein can be used with virtually any type of heavy duty vehicle including, for example, other types of trucks, trailers, etc., in both "tag" and "pusher" configurations and with both steerable and non-steerable lift axles. Accordingly, the various embodiments of the present technology described herein are not limited to use with a particular type of vehicle.

Figure 4A:
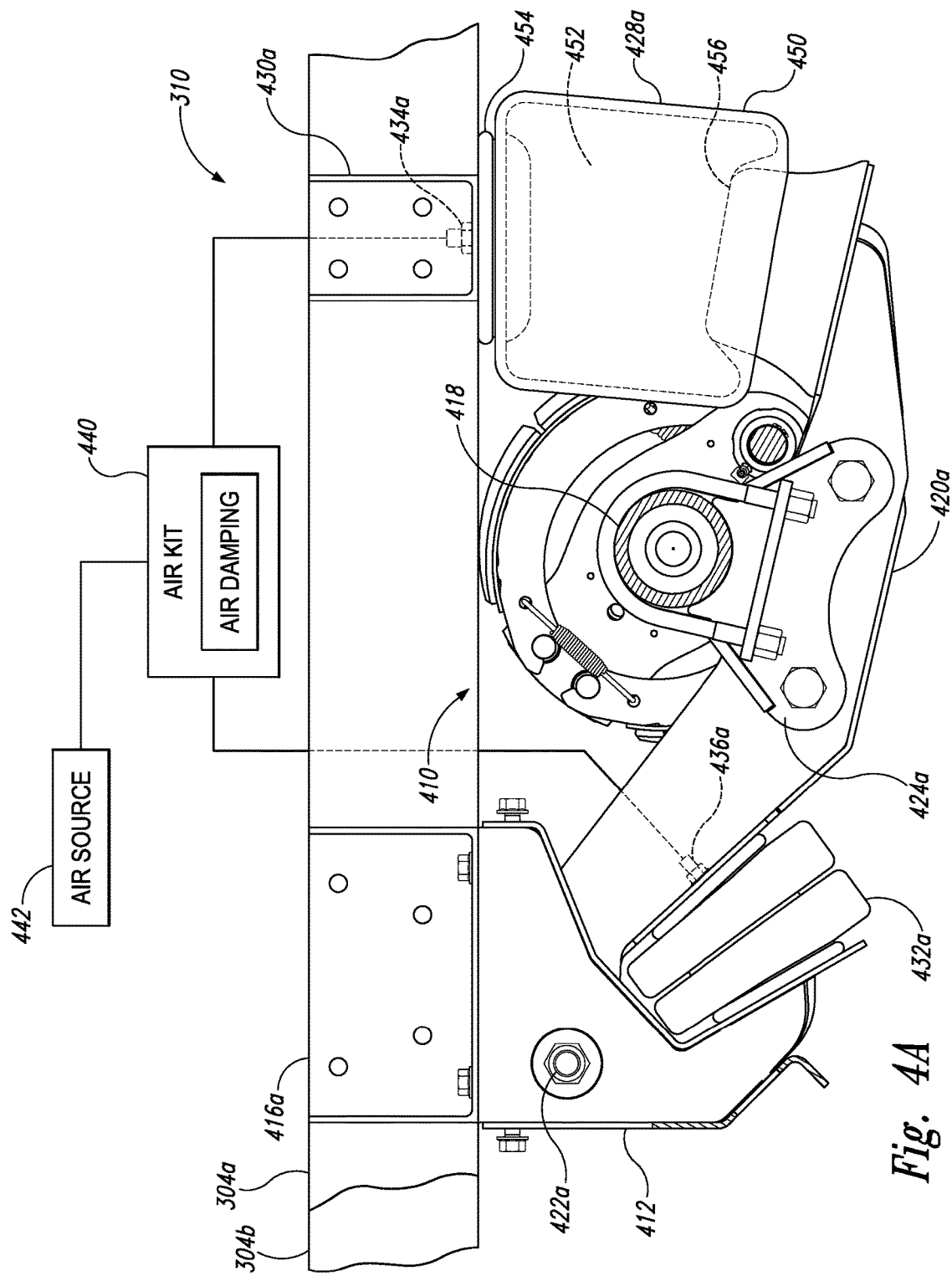
FIG. 4A is a partially schematic side view.

FIG. 4A is a partially schematic driver side view of the lift axle system 310, and FIG. 4B is an isometric view of the lift axle system 310. Referring to FIGS. 4A and 4B together, in the illustrated embodiment the lift axle system 310 includes a lift axle 410 and an air supply system 440 ("air kit 440"). The air kit 440 and the frame members 304a, b are omitted from FIG. 4B for purposes of clarity. In the illustrated embodiment, the lift axle 410 includes a support structure 412 (e.g., a steel weldment) that is fixedly attached to the spaced-apart frame members 304a, b with corresponding mounting brackets 416a, b. Two control arms 420a, b are pivotally coupled to the two opposite sides of the support structure 412 by corresponding pivot pins 422a, b (e.g., bolts). An axle member 418 extends transversely across the control arms 420a, b and is fixedly attached thereto with mounting brackets 424a, b and one or more U-bolts or other suitable means known in the art. Although the lift axle 410 is depicted as a non-steerable lift axle for purposes of illustration, the systems and methods described herein apply equally to steerable lift axles and accordingly are not limited to use with non-steerable axles.

In the illustrated embodiment, the lift axle 410 further includes first and second load springs 428a and 428b, respectively, and first and second lift springs 432a and 432b, respectively. A lower portion of the first load spring 428a is operably coupled to a distal end portion of the first control arm 420a, and an upper portion of the first load spring 428a is operably coupled to the first frame member 304a by means of a bracket 430a. The second load spring 428b is operably coupled between a distal end portion of the second control arm 420b and the second frame member 304b in the same manner by means of a bracket 430b. The first lift spring 432a is operably coupled between a lower portion of the support structure 412 and the first control arm 420a at a position between the first pivot pin 422a and the axle member 418, and the second lift spring 432b is similarly coupled between a lower portion of the support structure 412 and the second control arm 420b at a position between the second pivot pin 422b and the axle member 418.

In some embodiments, the load springs 428a, b and the lift springs 432a, b can be at least generally similar in structure and function to air springs known in the art for use with truck suspensions. For example, with reference to the load springs 428a, b, these can be single-bellows type load springs having flexible bellows 450 at least partially comprised of, for example, rubber, that defines an internal pressure chamber 452. The flexible bellows 450 can extend between a top plate 454 that is fixedly attached to the corresponding bracket 430 via, for example, one or more threaded studs (not shown), and a piston 456 that provides a lower mounting arrangement for attaching the load spring 428a, b to the distal end of the corresponding control arm 420. In addition to the foregoing features, each of the load springs 428a, b can further include an air fitting 434a, b (e.g., a fill-and-drain fitting), respectively, that permits pressurized air to flow into and out of the pressure chamber 452 in operation. The lift springs 432a, b can be at least generally similar in structure and function to the load springs 428a, b. For example, in the illustrated embodiment the lift springs 432a, b can be convoluted air springs having two or more bellows constrained by one or more girdle hoops, and each of the lift springs 432a, b can also include a corresponding air fitting 436a, b, respectively, that permits pressurized air to flow into and out of the bellows in operation. In other embodiments, the load springs 428a, b and/or the lift springs 432a, b can have other configurations that utilize internal pressure chambers for expansion and load carrying without departing from the spirit or scope of the present disclosure.

In the illustrated embodiment, the air kit 440 is operably connected in fluid communication to the air fittings 436a, b on the lift springs 432a, b and to the air fittings 434a, b on the load springs 428a. b. As described in greater detail below, the air kit 440 can selectively provide pressurized air from a vehicle air source 442 to the lift springs 432a, b to raise the lift axle 410, or to the lift springs 432a, b and the load springs 428a, b to lower the lift axle 410. In addition, the air kit 440 includes the ability to act as a shock absorber to dampen the motion of the lift axle 410 by restricting the air flow between the load springs 428 and the lift springs 432. It should be understood that the lift axle 410 described above and illustrated in FIGS. 4A and 4B is provided by way of example only, and embodiments of the air kit 440 described in detail herein are not limited to use with a particular lift axle configuration or a particular type of pressurized lift actuator or pressurized load spring.

Figure 5:
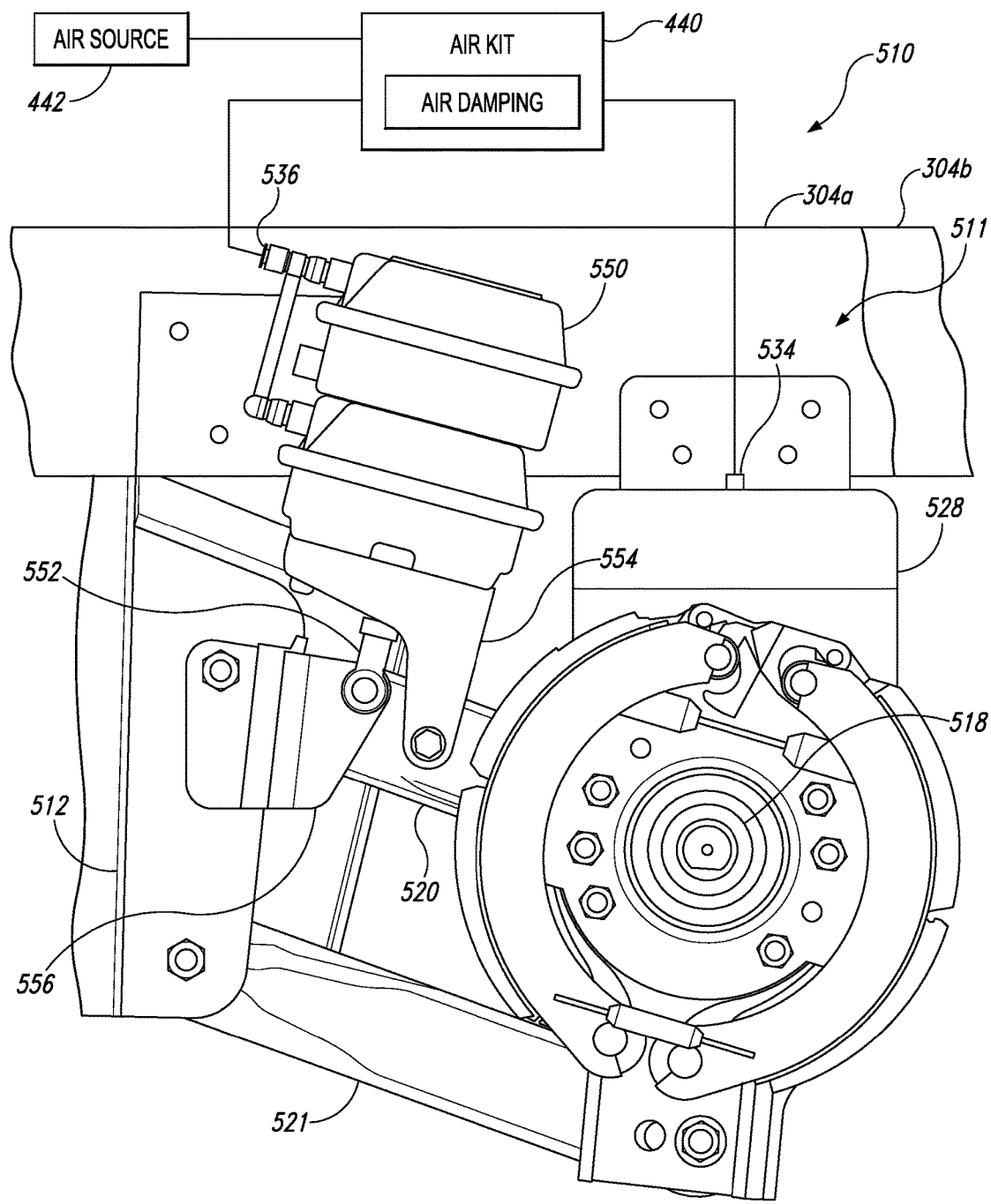
FIG. 5 is a partially schematic side view of an air damped lift axle system configured in accordance with another embodiment of the present technology.

As shown in FIG. 5, for example, in other embodiments the air damped systems described herein can be used with lift axles that utilize air cylinders instead of air springs to raise the axle. More specifically, FIG. 5 is a driver side view of a lift axle system 510 having the air kit 440 operably coupled to a lift axle 511. The lift axle 511 includes an axle member 518 that is movably attached to a support structure 512 by two laterally spaced-apart lower arms 521 and two laterally spaced-apart upper arms 520. Like the lift axle 410 described above, the lift axle 511 further includes two load springs 528 operably coupled between the axle member 518 and the vehicle frame members 304a, b to carry the load on the lift axle 511 in use. In this particular embodiment, however, the lift axle 511 includes two air cylinders 550 in place of air springs to raise the lift axle 511 when not in use. (It will be noted that although only the driver side upper arm 520, lower arm 521, load spring 528 and air cylinder 550 are shown in FIG. 5 by virtue of the perspective, the corresponding passenger side upper arm 520, lower arm 521, load spring 528, and air cylinder 550 are included on the opposite side of the lift axle 511.) The air cylinders 550 are pivotably coupled to the corresponding upper arms 520 by corresponding mounting brackets 554. Each of the air cylinders 550 includes a push rod 552 having a proximal end portion operably coupled to one or more pistons (not shown) within the air cylinder, and a distal end portion that is pivotally attached to the support structure 512 via a bracket 556. Although not shown, those of ordinary skill in the art will understand that each of the air cylinders 550 further includes an internal pressure chamber adjacent to the one or more pistons that can be pressurized via a corresponding air fitting 536 to drive the one or more pistons and the push rod 552 downwardly relative to the air cylinder. In some embodiments, the air cylinders 550 can be at least generally similar in structure and function to the "SuperChamber™ lift" provided by SAF-HOLLAND USA, Inc. of Muskegon, Mich. 49442. Examples of such air-driven lift devices are disclosed in U.S. Pat. Nos. 9,290,221 and 9,481,416 to Conaway, et al, which are incorporated herein by reference in their entireties. Examples of air springs are disclosed in International PCT Publication No. WO 2006/071172 of Terborn, et al, and in U.S. Pat. No. 4,934,667 to Pees, et al, which are also incorporated herein by reference in their entireties.

As with the lift axle system 310 described above, the air kit 440 is operably connected to air fittings 534 on the load springs 528, and to the air fittings 536 on the air cylinders 550 with corresponding high pressure air lines. To raise the lift axle 511, the air kit 440 provides pressurized air from the source 442 to the air cylinders 550, which in turn drives the push rods 552 downwardly relative to the corresponding air cylinders 550, thereby causing the lower and upper arms 521 and 520, respectively, to rotate upwardly about the support structure 512 by means of the brackets 554 and raise the lift axle 511. As described in further detail below, the air kit 440 can selectively provide pressurized air to the air cylinders 550 to raise the lift axle 511 as described above, or provide pressurized air to both the load springs 528 and the air cylinders 550 to lower the lift axle 511 for use.

Figure 6A:
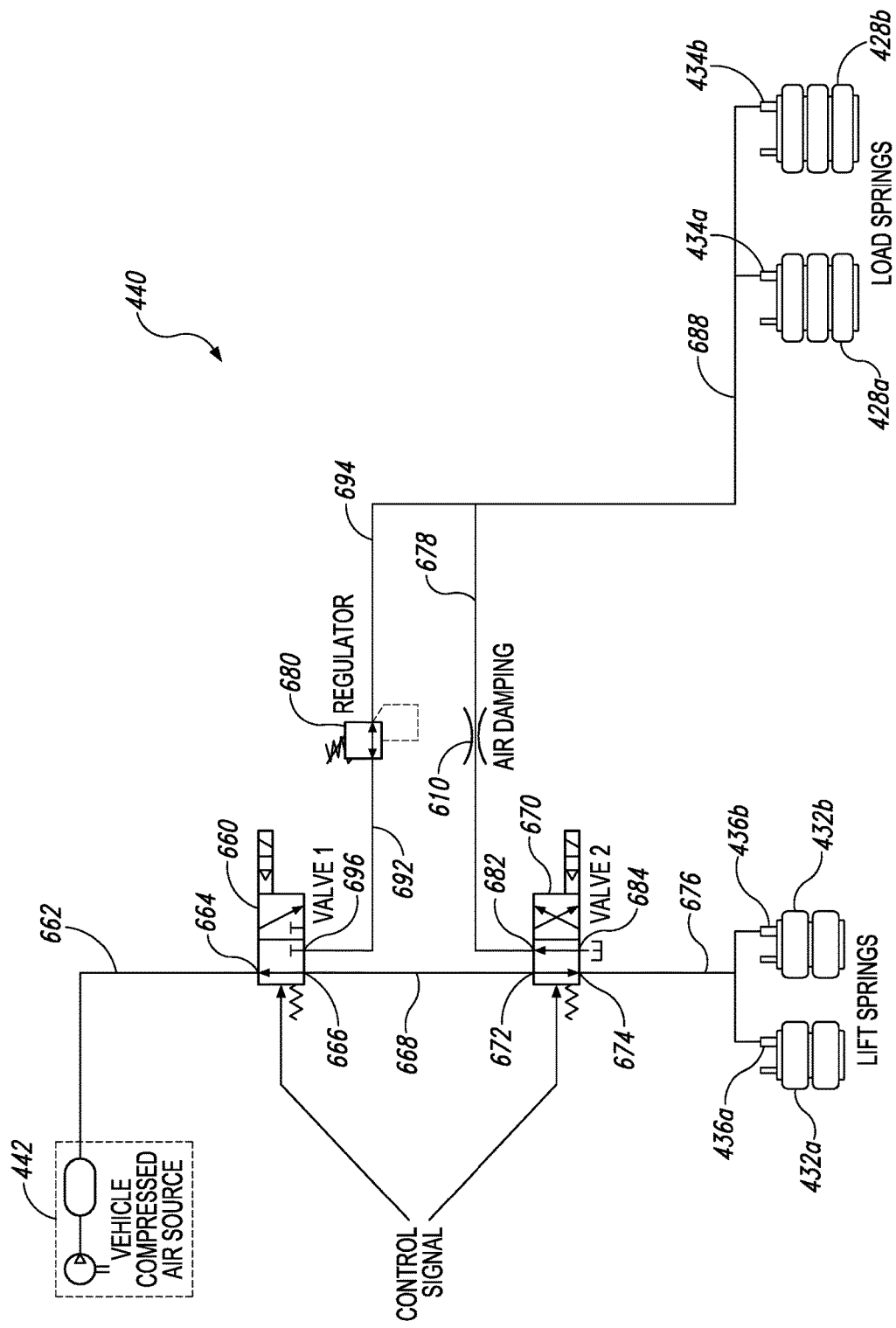
FIGS. 6A and 6B are schematic diagrams of an air kit configured in accordance with an embodiment of the present technology and in two states of operation.
Figure 6B:
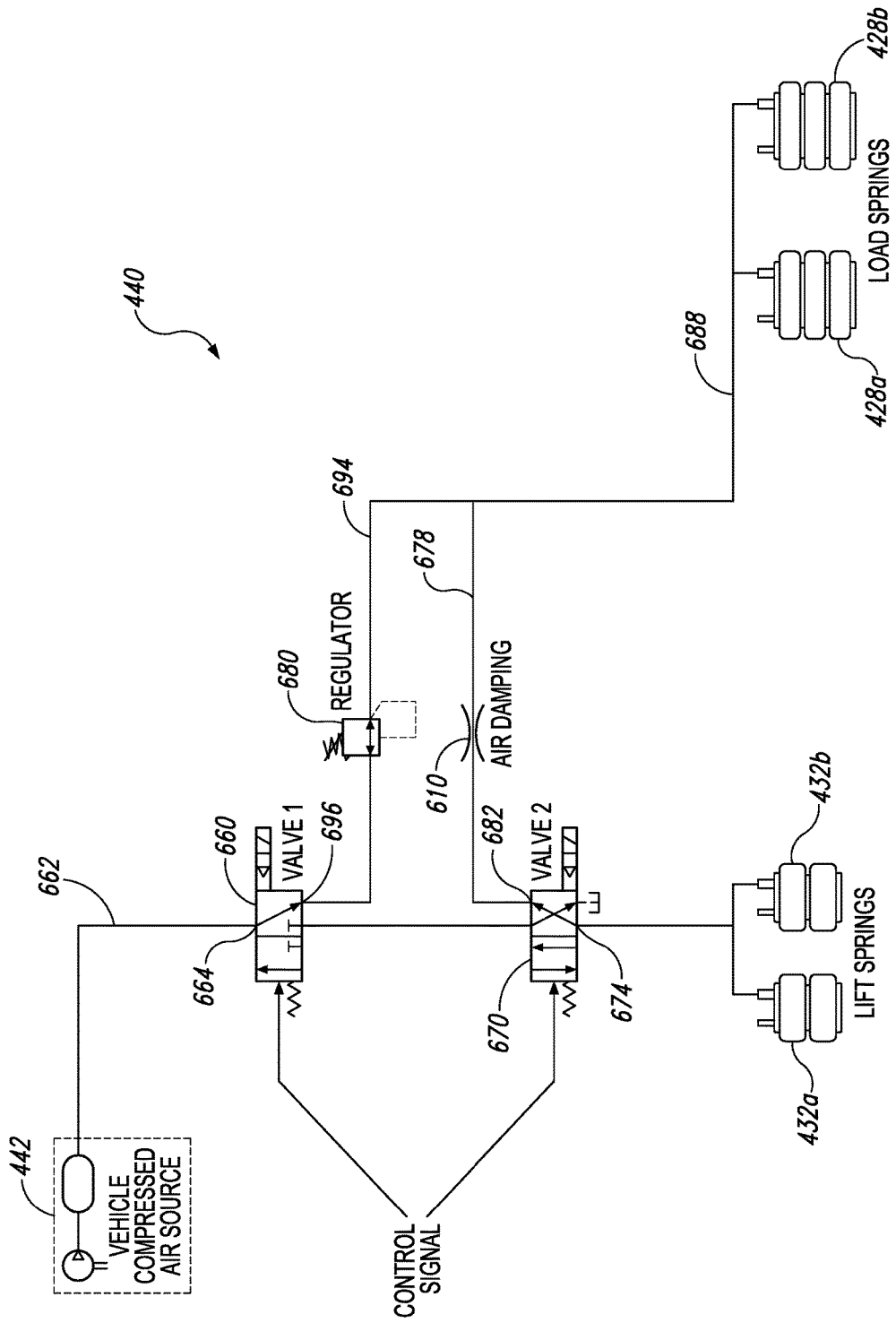

FIGS. 6A and 6B are schematic diagrams of the air kit 440 configured in accordance with an embodiment of the present technology. For purposes of illustration and clarity, the air kit 440 is operably connected to the load springs 428a, b and the lift springs 432a, b of the lift axle 410 (FIGS. 4A and 4B) and is described below in this context. It should be understood, however, that the air kit 440 can be operably connected to a wide variety of other lift axles that use compressed air for vehicle suspension and axle lifting (such as the lift axle 510 described above with reference to FIG. 5) and used in the manner described herein. Additionally, it should also be understood that the systems described herein are not limited to use with pressurized air, and in some embodiments can be used with other types of pressurized gas (e.g., nitrogen).

Referring first to FIG. 6A, in the illustrated embodiment the air kit 440 includes a first valve 660, a second valve 670, and a pressure regulator 680. The first valve 660 can be a three port, two position valve (a "3/2 valve") activated by an internal air pilot signal. In some embodiments, the air pilot signal can be controlled by an electric solenoid that is operably coupled to the valve and receives an electric operating signal from an operating switch. In some embodiments, the operating switch can be a manual switch (e.g., a manual rocker-type switch, button, etc.) that can be operated by, for example, the vehicle operator to raise and lower the lift axle 410 as desired. For this reason, the illustrated embodiment of the air kit 440 can be referred to as a "manual control" air damping kit because it is controlled by an operator and not automatically controlled by an electronic control unit ("ECU") or other automatic system based on, for example, a state of the suspension or vehicle. In other embodiments, the first valve 660 and/or the second valve 670 can be solenoid-actuated valves that are automatically controlled by electric signals from a controller or other processing device (e.g., a vehicle ECU) based on, for example, a state of the suspension or vehicle, load, driving condition, etc.

As noted above, in the illustrated embodiment the first valve 660 can be a "3/2 valve." More specifically, the valve 660 can include a first port 664 that is pneumatically connected in fluid communication to the vehicle compressed air source 442 via a conduit 662. The first valve 660 can further include a second port 666 which is pneumatically connected to a first port 672 on the second valve 670 by a conduit 668, and a third port 696 that is pneumatically connected to the pressure regulator 680 via a conduit 692. Unless otherwise specified herein, each of the conduits 662, 668, and 692, as well as well as the other high pressure gas (e.g., air) conduits described herein, can be comprises of any suitable conduit (e.g., high pressure air line, tubing, hose, pipe, etc.) manufactured from any suitable material (e.g., steel, aluminum, reinforced rubber, braided wire, etc.) known in the art for use with high pressure air/pneumatic systems on trucks and other vehicles.

In the illustrated embodiment, the second valve 670 can be a four port, two position valve (a "4/2 valve") that can be activated by a corresponding solenoid in response to the same electric signal as the first valve 660. Accordingly, in the illustrated embodiment, when the air kit 440 is in the "energized state" both of the first valve 660 and the second valve 670 are electrically activated and energized, and similarly, in the de-energized state both the first valve 660 and the second valve 670 are de-energized. In addition to the first port 672, the second valve 670 further includes a second port 674, a third port 682, and an exhaust port 684. The second port 674 is pneumatically connected to the air fittings 436a, b on the lift springs 432a, b via a branched conduit 676. By way of example only, in some embodiments the second valve 670 can be at least generally similar in structure and function to 4/2 solenoid valves provided by MAC Valves of Wixom, Mich., 48393, USA, such as MAC part number 912B-PP-600JM. In other embodiments, any suitable valves known in the art can be employed with the systems described herein.

In the illustrated embodiment, the pressure regulator 680 is pneumatically connected to the air fittings 434a, b on the load springs 428a, b via a conduit 694 and a branched conduit 688. The pressure regulator 680 can be set to a desired level referred to herein as the "regulated pressure" so that the air provided to the load springs 428a, b and the lift springs 432a, b (when the lift axle is operational) does not exceed the regulated pressure. Typically, the regulated pressure is set so that the primary load on the lift axle 410 is under the rated load determined by the manufacturer. The regulated pressure can also be set so that the load carried by the lift axle 410 is at least approximately equal to the load carried by one or more adjacent (e.g., non-lift) axles to evenly distribute the load. In some embodiments, the pressure regulator 680 can be a manually adjustable pressure regulator as known in the art which can be set to the desired regulated pressure by an operator or system installer. In other embodiments, the pressure regulator may be preset to the desired regulated pressure, or it may be electronically controlled via input from user interface or a system controller. Accordingly, the pressure regulator 680 may be any suitable pressure regulator known in the art for reducing the pressure of air from the compressed air source 442 to a desired regulated pressure for operation of a lift axle as described herein. For example, in some embodiments the pressure regulator 680 can be a Parker 14R113F pressure regulator provided by Parker Hannifin of Richland, Mich., 49083. USA.

In the illustrated embodiment, a conduit 678 pneumatically connects the third port 682 on the second valve 670 to the conduit 694 extending from the pressure regulator 680, and to the branch conduit 688 pneumatically connected to the air fittings 434*a, b* on the load springs 428*a, b*. Accordingly, in operation the pressure in the conduit 678 will be equal to, or at least substantially equal to, the pressure in the conduits 694 and 688. In a further aspect of this embodiment, the air kit 440 includes an air damping feature 610 in fluid communication with the conduit 678. As described in greater detail below, the air damping feature 610 can include, for example, an air flow restriction in the conduit 678 or in fluid communication with the conduit 678 that dampens the flow of pressurized air flowing back and forth between the load springs 428*a, b* and the lift springs 432*a, b* to thereby dampen motion of the lift axle 410 in use.

Referring to FIG. 6A together with FIGS. 4A and 4B, and assuming that the lift axle 410 is initially in the lowered position shown in FIGS. 4A and 4B and the operator wishes to raise the lift axle 410 to the lifted position, the operator can do so by moving or otherwise actuating a switch (e.g., a manual rocker-type switch; not shown) to simultaneously de-energize the first valve 660 and the second valve 670. In the de-energized state shown in FIG. 6A, air at the system pressure flows from the compressed air source 442, through the first valve 660, and then through the second valve 670 to the lift springs 432*a, b*. Concurrently, air pressure in the load springs 428*a, b* is exhausted through the conduit 688, the conduit 678 and the exhaust port 684 on the second valve 670. As a result, the lift springs 432*a, b* inflate and extend, thereby raising the lift axle 410, while concurrently the load springs 428*a, b* are allowed to drain and compress so that the lift axle 410 can move into the lifted position. Although not shown in the illustrated embodiment, in other embodiments the air kit 440 can include a quick release valve in fluid communication with the conduit 688 that can be configured to drain the pressurized air from the load springs 428*a, b* more rapidly than the second valve 670 when the lift springs 432*a, b* are inflated to raise the lift axle 410. Such a quick release valve can be at least generally similar in structure and function to the quick release valve 238 described above with reference to FIGS. 2A and 2B, and can be activated by, for example, a drop in air pressure in the conduit 678, or by an appropriately-timed electrical signal.

Referring next to FIG. 6B together with FIGS. 4A and 4B, to lower the lift axle 410 and engage the wheels 312 with the ground 314 (FIG. 3), the operator activates the switch to energize both the first valve 660 and the second valve 670. In the energized state shown in FIG. 6B, air at the system pressure flows from the compressed air source 442 to the pressure regulator 680 via the first port 664 and the third port 696 of the first valve 660. Air at the regulated pressure then flows from the pressure regulator 680 to the load springs 428*a, b* via the conduits 694 and 688. Concurrently, the pressurized air in the lift springs 432*a, b* is partially exhausted into the load springs 428*a, b* via the second valve 670 and the conduit 678 until the pressure equalizes between the load springs 428*a, b* and the lift springs 432*a, b*. The flow of air into the load springs 428*a, b* at the regulated pressure causes them to overcome the lift springs 432*a, b* (which are at, or near, the same pressure) and expand, thereby driving the lift axle 410 into the lowered position. Note that the system pressure is greater than the regulated pressure, and as described above air at the system pressure flows into the lift springs 432*a, b* to raise the lift axle 410, but air at the regulated pressure flows into the load springs 428*a, b* to lower and use the lift axle 410. Although, in the illustrated embodiment, the first valve 660 and the second valve 670 are energized to lower the lift axle 410, in other embodiments the energized and de-energized states can be reversed so that both valves are energized to raise the lift axle 410 and de-energized to lower the lift axle 410. In such embodiments, the first and second valves 660 and 670 would be energized in the positions shown in FIG. 6A and de-energized in the positions shown in FIG. 6B.

As noted above, the load springs 428*a, b* can be configured to overcome the lift springs 432*a, b* and drive the lift axle 410 into the lowered position when the two spring sets are at the same, or at least substantially the same, internal pressure. For example, in some embodiments the load springs 428*a, b* can have a larger cross-sectional area (e.g., a larger diameter) so that they will provide a greater extension force than the lift springs 432*a, b* when at the same pressure. Additionally, in the illustrated embodiment the load springs 428*a, b* are positioned to act on the control arms 420*a, b* at a location further away from the pivot pins 422*a, b* than the lift springs 432*a, b* to thereby give the load springs 428*a, b* a mechanical advantage over the lift springs 432*a, b*. It should also be noted that the weight of the lift axle 410 assists the load springs 428*a, b* in driving the lift axle 410 downward to the lowered position.

During operation of the lift axle 410 in the lowered position shown in FIGS. 3-4B, both the first valve 660 and the second valve 670 are in the energized state shown in FIG. 6B. The load springs 428*a, b* contract and expand in response to up and down movement, respectively, of the lift axle 410 resulting from road conditions, load shifting, etc. and the lift springs 432*a, b* move in the opposite direction to the load springs 428*a, b*. As this happens, compression of the load springs 428*a, b* (and corresponding expansion of the lift springs 432*a, b*) drives pressurized air from the load springs 428*a, b* into the lift springs 432*a, b* via the conduit 678 and the second valve 670. Similarly, compression of the lift springs 432*a, b* (and corresponding expansion of the load springs 428*a, b*) drives pressurized air from the lift springs 432*a, b* back to the load springs 428*a, b* via the same path. As the air flows back and forth between the load springs 428*a, b* and the lift springs 432*a, b*, the damping feature 610 (e.g., a flow restriction) resists the air flow and dampens the flow in proportion to the flow rate, which thereby dampens the motion of the lift axle 410. Accordingly, by pneumatically connecting the internal volume of the lift springs 432*a, b* to the internal volume of the load springs 428*a, b* and providing a flow restriction or other damping feature therebetween, lift axle systems can provide efficient jounce and rebound damping of axle motion without the added cost or complexity of conventional air dampers or conventional hydraulic shock absorbers.

Various types of damping structures and features can be pneumatically connected between the load springs 428*a, b* and the lift springs 432*a, b* to provide a desired level of damping including, but not limited to, the use of air lines or other conduits and/or fittings having cross sectional flow areas (e.g., diameters) that are relatively small in relation to the internal volumes of the air springs. The diameter of the conduit and/or the length of the conduit, or the length of a particular section of the conduit having a particular diameter, can be varied to change the amount of effective restriction (and hence, damping) between the load spring air chambers and the lift spring air chambers. In other embodiments, the air fill/drain ports 434a, b on the load springs 428a, b, and/or the fill/drain ports 436a, b the lift springs 432a, b, can be reduced or otherwise appropriately sized in relation to the air spring internal volume to provide the desired level of air flow damping. In still further embodiments, one or more fixed or moveable (e.g., electrically-controlled) orifices can be positioned in the conduit 678 or in fluid communication with the conduit 678 between the load springs 428a, b and the lift springs 432a, b. For example, one or more flow control orifice valves, which allow unrestricted flow in one direction and restricted flow in the other, could be used in this manner. Additionally, in some embodiments two flow control valves could be used in parallel to provide a different level of damping in the jounce (compression) and rebound (extension) directions. In still other embodiments, one or more throttling valves can be positioned in the conduit 678 to dampen the air flow between the load springs 428a, b and the lift springs 432a, b.

The operation of the air kit 440 as described above with reference to FIGS. 4A, 4B, 6A and 6B applies equally to use of the air kit 440 with the lift axle system 510 of FIG. 5. For example, referring to FIG. 6A together with FIG. 5, and assuming that the lift axle 511 is initially in the lowered position shown in FIG. 5, the operator can raise the lift axle 511 by actuating the control switch to simultaneously de-energize the first valve 660 and the second valve 670 and allow air at the system pressure to flow from the compressed air source 442 to the two air cylinders 550. Concurrently, pressurized air is exhausted from the two load springs 528. The pressurized air flowing into the pressure chambers of the air cylinders 550 drives the air cylinder pistons (not shown) downwardly relative to the orientation of the air cylinders 550 shown in FIG. 5, which in turn drives the corresponding push rods 552 downwardly and outwardly from the air cylinders 550. This causes the lower and upper arms 521 and 520, respectively, to rotate upwardly about the support structure 512 and raise the lift axle 511. Referring next to FIG. 6B together with FIG. 5, to lower the lift axle 511 and engage the wheels with the ground, the operator activates the switch to energize both the first valve 660 and the second valve 670 so that air from the compressed air source 442 flows to the load springs 528 at the regulated pressure. Concurrently, some of the pressurized air in the air cylinders 550 is partially exhausted into the load springs 528 until the pressure equalizes between the load springs 528 and the air cylinders 550. As noted above, the load springs 528 can be configured to overcome the air cylinders 550 and drive the lift axle 511 into the lowered position when the load springs 528 and the air cylinders 550 are at the same, or at least substantially the same, internal pressure. For example, in some embodiments the load springs can have a larger effective cross-sectional diameter than the effective surface area of the air cylinder pistons.

During operation in the lowered position, the load springs 528 contract and expand in response to up and down movement of the lift axle 511 resulting from road conditions, load shifting, etc. and the pressure chambers of the air cylinders 550 move in the opposite direction to the load springs 528. As this happens, compression of the load springs 528 (and corresponding extension of the air cylinders 550) drives pressurized air from the load springs 528 into the air cylinders 550 via the conduit 678. Similarly, contraction of the air cylinder pressure chambers (and corresponding extension of the load springs 528) drives pressurized air from the air cylinders 550 back to the load springs 528 via the same path. As the air flows back and forth between the load springs 528 and the air cylinders 550 via the conduit 678, the damping feature 610 (e.g., a flow restriction) resists the air flow and dampens the flow in proportion to the flow rate, which thereby dampens the motion of the lift axle 511.

Figure 7A:
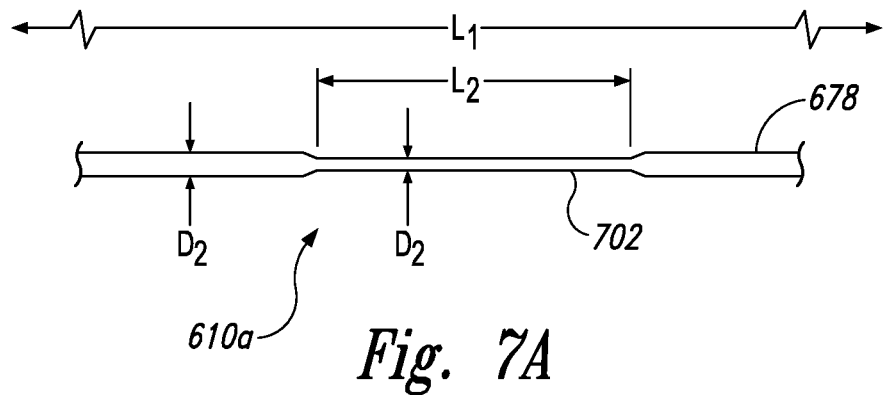
FIGS. 7A-7C illustrate various air damping structures that can be used with air damped lift axle systems configured in accordance embodiments of the present technology.

As discussed above, the lift axle air kits described herein can include various types of air damping features in accordance with the present technology. FIG. 7A, for example, is a cross sectional view of the conduit 678 (FIGS. 6A and 6B) having an air damping feature 610a configured in accordance with an embodiment of the present technology. (It will be understood that the air damping feature 610a can be used as the air damping feature 610 in FIGS. 6A and 6B.) In the illustrated embodiment, the conduit 678 has an overall length $L_1$ and a first diameter $D_1$ (e.g. a diameter of from about 0.1 inch to about 0.5 inch, or about 0.25 inch) over the majority of its length. The air damping feature 610a includes a flow restriction 702 formed by reducing the diameter of the conduit 678 from the first diameter $D_1$ to a second diameter $D_2$ (e.g. a diameter of from about 0.06 inch to about 0.4 inch, or about 0.12 inch) over a length $L_2$. As a result, the reduced diameter $D_2$ creates a flow restriction that dampens the air flow back and forth through the conduit 678, thereby damping the compression/extension of the load springs 428a, b and the corresponding extension/compression of the lift springs 432a, b (FIGS. 4A and 4B). In other embodiments, the length $L_2$ of the reduced-diameter portion can be selected to further vary the amount of effective flow restriction in the conduit 678. In still further embodiments, the overall length $L_1$ of the conduit 678 can be selected to vary an amount of effective flow resistance through the conduit 678 either alone or in combination with the flow restriction 702.

Figure 7B:
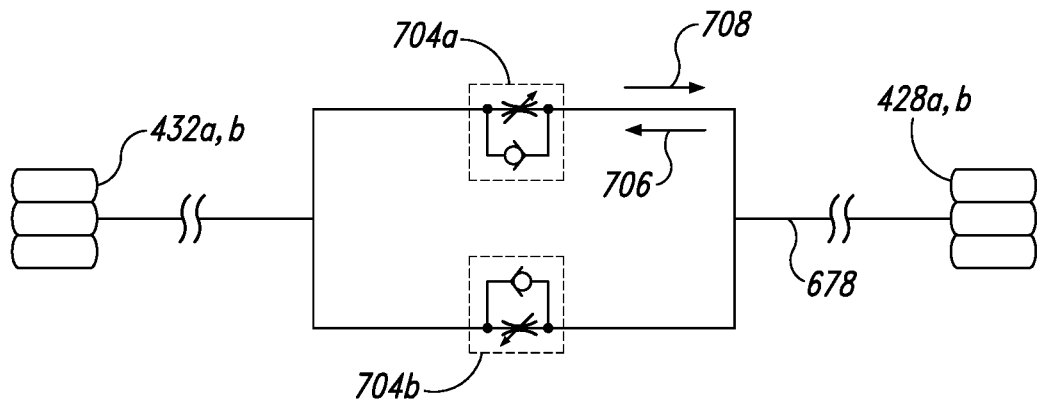

FIG. 7B is a schematic diagram of an air damping feature 610b that can be used to dampen the airflow between the load springs 428a, b and the lift springs 432a, b in accordance with another embodiment of the present technology. In the illustrated embodiment, the conduit 678 can include at least one flow control valve 704a (such as a Parker 3250 series valve provided by Parker Hannifin of Richland, Mich., USA, 49083) that allows unrestricted flow in a first direction indicated by arrow 706, and restricts the flow in a second direction indicated by arrow 708. For example, in some embodiments the flow control valve 704a can permit unrestricted airflow from the load springs 428a, b to the lift springs 432a, b, but restrict the airflow from the lift springs 432a, b to the load springs 428a, b to thereby provide a greater level of damping when the lift axle 410 (FIGS. 4A and 4B) moves in the rebound direction (i.e., the suspension extends) than in the jounce direction (i.e., the suspension compresses). Additionally, the flow control valve 704a can be manually adjustable, thereby enabling an operator to set a desired level of flow restriction (damping) in the restricted direction 708. Another way to accomplish different levels of damping can be achieved by adding a second flow control valve 704b. In this embodiment, the first valve 704a can be configured to prevent airflow in the second direction 708, and the second valve 704b can be configured to prevent airflow in the first direction 706. As a result, air flowing from the load springs 428a, b to the lift springs 432a, b must flow through the first flow control valve 704a, and airflow from the lift springs 432a, b to the load springs 428a, b must flow through the second flow control valve 704b. Additionally, either of the flow control valves 704a, b can be adjusted to provide a different level of damping than the other flow control valve 704a, b so that the damping provided in the jounce direction and in the rebound direction can be different and tuned to a desired level. Although the control valves 704a, b are adjustable in the illustrated embodiment, in other embodiments the control valves 704 can be non-adjustable. In still further embodiments, rather than using flow control valves, any other type of suitable flow damping device or structure known in the art including, for example, throttling valves, can be pneumatically connected between one or more load spring pressure chambers and one or more lift spring (or lift cylinder, etc.) pressure chambers in a lift axle system as described herein to provide suspension damping in accordance with the present technology. Accordingly, embodiments of the lift axle air damping systems described herein are not limited to any particular air damping apparatus or method unless expressly specified otherwise herein.

Figure 7C:
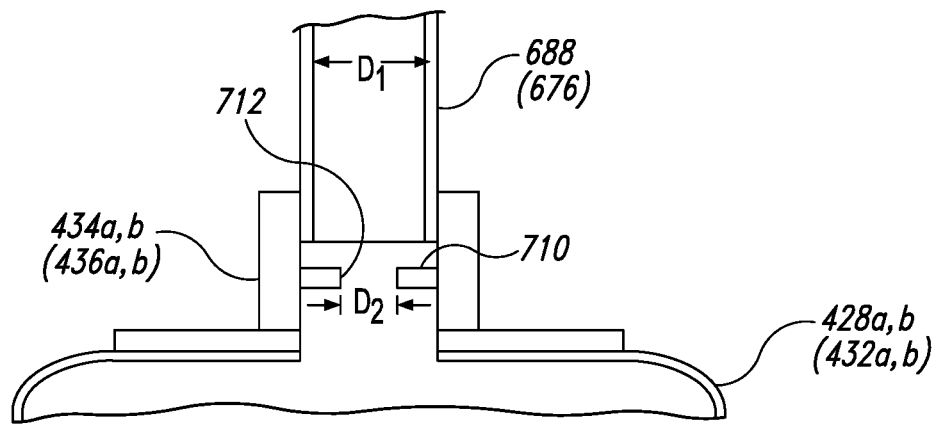

FIG. 7C is an enlarged side cross-sectional view of an upper portion of the load springs 428a, b (and/or the lift springs 432a, b) illustrating another approach to damping the airflow between the two air spring sets. In this embodiment, one or more of the air fittings 434a, b on the load springs 428a, b, and/or one or more of the air fittings 436a, b on the lift springs 432a, b, can include a flow restrictor 710 having an orifice 712 with a diameter $D_2$ that is less than a diameter $D_1$ of the corresponding conduit 688 or 676. In operation, the flow restriction provided by the reduced diameter of the orifice 712 dampens the flow of air into and out of the corresponding load or lift spring to thereby dampen motion of the lift axle suspension as described above.

Figure 8:
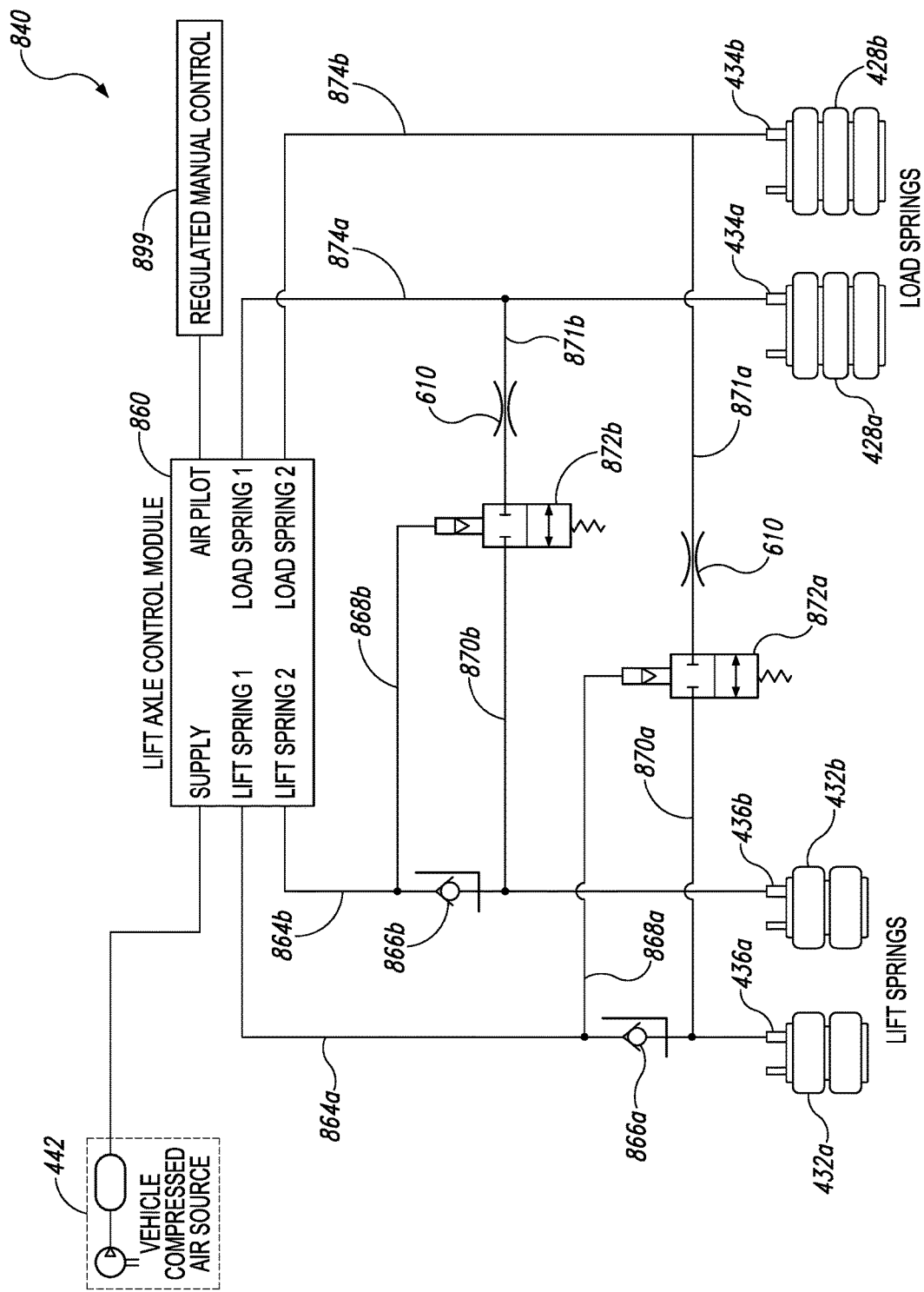
FIG. 8 is a schematic diagram of an air kit configured in accordance with another embodiment of the present technology.

FIG. 8 is a schematic diagram of an air kit 840 configured in accordance with another embodiment of the present technology. For purposes of illustration, the air kit 840 is operably connected to the load springs 428a,b and the lift springs 432a,b of the lift axle 410 described above with reference to FIGS. 4A and 4B, and operation of the air kit 840 is described below in this context. In other embodiments, however, that the air kit 840 can be operably connected to a wide variety of other lift axles that use compressed gas (e.g., air) for vehicle suspension and axle lifting (such as the lift axle 510 described above with reference to FIG. 5). Accordingly, the air kit 840 is not limited to use with any particular lift axle configuration, but can be used with other lift axles in accordance with the present disclosure.

In the illustrated embodiment, the air kit 840 includes a lift axle control module 860 that is operably connected to the vehicle air source 442 and a manual control switch 899. The lift axle control module 860 includes one or valves for controlling pressurized air flow to and from the lift springs 432a, b and the load springs 428a, b to raise and lower the lift axle 410 in response to control signals from the switch 899. By way of example, in some embodiments the lift axle control module 860 can be a commercially available lift axle control module, such as an air actuated control module (e.g., part no. 5040-111-01C) or a solenoid actuated control module (e.g., part no. 5040-311-01C or part no. 5040-211-01C) provided by IMI Precision Engineering (Norgren Inc.), 5400 South Delaware Street, Littleton, Colo. 80120. Examples of lift axle control modules are disclosed in U.S. Pat. No. 7,735,516 to Morris, which is incorporated herein by reference in its entirety. In other embodiments, the air kit 840 can include other types of lift axle control modules known in the art.

The lift axle control module 860 is operably connected in fluid communication to the first lift spring 432a by a conduit 864a, and to the second lift spring 432b by a conduit 864b. Similarly, the lift axle control module 860 is also operably connected in fluid communication to the first load spring 428a by a conduit 874a, and to the second load spring 428b by a conduit 874b. In one aspect of this embodiment, the first lift spring 432a can be operably connected in fluid communication to a first pilot operated 2/2 valve 872a by a conduit 870a, and the second lift spring 432b can be similarly connected to a second pilot operated 2/2 valve 872b by a conduit 870b. The first pilot operated 2/2 valve 872a can be operably connected in fluid communication to the second load spring 428b by a conduit 871a, and the second pilot operated 2/2 valve 872b can be similarly connected to the first load spring 428a by a conduit 871b.

To raise the lift axle 410 (FIGS. 4A and 4B) an operator can move or otherwise actuate the control switch 899 to send a corresponding signal to the lift axle control module 860. The lift axle control module 860 can be controlled via a regulated pressure signal or an electrical signal depending on the configuration of the lift axle control module 860. In response to the signal from the control switch 899, the lift axle control module 860 directs pressurized air to flow from the compressed air source 442 to the lift springs 432a,b via the conduits 864a,b, respectively. As pressurized air flows into the lift springs 432a,b they inflate and extend, thereby raising the lift axle 410 as described above. Concurrently, the lift axle control module 860 allows air to exhaust from the load springs 428a,b via the conduits 874a,b, respectively, as the load springs 428a, b are compressed. Additionally, the air pressure in the conduits 864a,b flows to the corresponding pilot operated 2/2 valves 872a,b via conduits 868a,b, respectively, and causes the 2/2 valves 872a,b to close. (The 2/2 valves 872a, b are shown in the closed configuration in FIG. 8.) Closing of the first 2/2 valve 872a prevents fluid communication between the first lift spring 432a and the second load spring 428b, and closing of the second 2/2 valve 872b prevents fluid communication between the second lift spring 432b and the first load spring 428a.

When the operator commands the air kit 840 to deploy the lift axle 410 to the lowered state by operation of the control switch 899, the lift axle control module 860 allows the pressure to drop in the conduits 864a,b. When this happens, the air in the lift springs 432a,b is prevented from exhausting through the corresponding conduits 864a,b, respectively, by check valves 866a,b (e.g., one-way valves). However, the resulting loss in pressure to the pilot operated 2/2 valves 872a,b via the corresponding conduits 868a,b, respectively, causes the 2/2 valves 872a,b to move from the closed position shown in FIG. 8 to the open position, thereby allowing the air in the lift springs 432a,b to at least partially exhaust into the load spring 428b,a, respectively, until the pressure is equalized, or at least substantially equalized, between the lift springs 432a, b and the load springs 428b, a, respectively. At or near the same time, regulated air from the lift axle control module 860 is supplied to the load springs 428a,b via the corresponding conduits 874a,b, respectively, and the regulated air is also allowed to flow to the lift springs 432a,b via the open 2/2 valves 872a, 872b, respectively. As noted above, the load springs 428a,b can be configured to overcome the lift springs 432a,b and drive the lift axle 410 into the lowered position when the two springs sets are at the same, or at least substantially the same, internal pressure. In the foregoing manner, the lift axle 410 is deployed to the lowered position.

In a further aspect of this embodiment, the air kit 840 includes a first one of the air damping features 610 in fluid communication with the conduit 871a, and a second one of the air damping features 610 in fluid communication with the conduit 781b. As described in detail above, the air damping features 610 can include, for example, an air flow restriction in the corresponding conduits 871, *a,b* that dampen the flow of pressurized air back and forth between the load springs 428*a,b* and the lift springs 432*b,a*, respectively, to thereby dampen motion of the lift axle 410 when it is in use in the lowered position. As also noted above, the air damping feature 610 can include various types of damping structures and features to provide a desired level of damping including, but not limited to, the air damping features 610*a*, 610*b*, and 710 described in detail above with reference to FIGS. 7A, 7B and 7C, respectively. By pneumatically connecting the internal volumes of the load springs 428*a,b* to the internal volumes of the lift springs 432*b*, 432*a*, respectively, and providing a flow restriction or other damping feature therebetween, lift axle systems can provide efficiently damped motion of the axle without the added cost or complexity of conventional air dampers or hydraulic shock absorbers.

One benefit of embodiments of the air damped lift axle systems described herein is that they can provide suspension damping without the addition of hydraulic shock absorbers or other costly hardware. Some embodiments of the air damped lift axle systems can also improve vehicle ride by providing better control of the lift axle (e.g., the lift axle 410 of FIGS. 4A and 4B) and the sprung mass near the natural frequencies of the suspension system by damping the airflow between the load springs and the lift springs. Additionally, it is expected that some embodiments of the lift axle systems described herein can reduce tire wear as compared to conventional lift axles that do not include shock absorbers for damping. Further benefits that could be provided by the air damped systems described herein include increased life and less maintenance of suspension components as compared to conventional systems with hydraulic shock absorbers. Cost reduction may also be achieved by eliminating the costs associated with hydraulic shock absorbers and associated bracketry. Additionally, it is contemplated that some embodiments of the technology described herein have the potential to be easily retrofitted onto existing lift axle suspensions without the addition of structural brackets as could otherwise be required to support, for example, hydraulic shock absorbers. It is also contemplated that some embodiments of the air kits described herein can provide reduced air consumption over conventional air kits by using a portion of the air from the lift springs 432*a, b* to fill the load springs 428*a, b* during deployment, rather than simply exhausting this air to the atmosphere. Additionally, some embodiments of the air kits described herein can reduce the time required to raise the lift axle suspension because rather than being at a very low pressure (e.g., ambient pressure), the lift springs 432*a, b* should generally always be inflated to the regulated pressure of the system when the lift axle is lowered, and thus the pressure in the lift springs 432*a, b* will only have to increase from the regulated pressure to the system pressure to raise the lift axle. In some embodiments, it is also possible that the air kits described herein can reduce the time required to lower the lift axle suspension because a portion of the air from the lift springs 432*a, b* will flow into the load springs 428*a, b* in addition to the air flowing into the load springs 428*a, b* from the vehicle air source. However, whether the air contribution from the lift springs 432*a, b* actually reduces the time to lower the suspension may depend on whether this effect offsets the force from the lift springs 432*a, b* pushing back against the load springs 428*a, b* during the lowering process.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A vehicle suspension system comprising:
   an axle for supporting one or more wheels on opposite end portions thereof;
   a first gas chamber operably coupled to the axle, wherein movement of the axle in a first direction compresses the first gas chamber;
   a second gas chamber operably coupled to the axle, wherein movement of the axle in a second direction, opposite to the first direction, compresses the second gas chamber; and
   a conduit operably connecting the first gas chamber to the second gas chamber, wherein compression of the first gas chamber in response to movement of the axle in the first direction drives gas from the first gas chamber to the second gas chamber through the conduit, wherein compression of the second gas chamber in response to movement of the axle in the second direction drives gas from the second gas chamber to the first gas chamber through the conduit, and wherein the axle is a lift axle that is movable relative to a vehicle frame between a lowered position in which the wheels are in contact with the ground and a raised position in which the wheels are spaced apart from the ground.

2. The vehicle suspension system of claim 1 wherein the first gas chamber is a portion of a load spring configured to carry load between the lift axle and the vehicle frame when the lift axle is in the lowered position in which the wheels are in contact with the ground, and wherein the second gas chamber is a portion of a lift actuator configured to move the lift axle from the lowered position to the raised position in which the wheels are spaced apart from the ground.

3. The vehicle suspension system of claim 2 wherein the load spring is a first gas spring having flexible bellows that form a portion of the first gas chamber, and wherein the lift actuator is a second gas spring having flexible bellows that form a portion of the second gas chamber.

4. The vehicle suspension system of claim 2 wherein the load spring is a gas spring having flexible bellows that form a portion of the first gas chamber, and wherein the lift actuator is a gas cylinder having a piston that forms a portion of the second gas chamber.

5. The vehicle suspension system of claim 2 wherein the conduit is a portion of a gas kit operably connected in fluid communication to the load spring and the lift actuator, wherein the gas kit is configured to provide pressurized gas to the second gas chamber to move the lift axle in the first direction from the lowered position to the raised position, and wherein the gas kit is further configured to provide pressurized gas to the first gas chamber to move the lift axle in the second direction from the raised position to the lowered position.

6. The vehicle suspension system of claim 2 wherein the conduit is a portion of a gas kit operably connected in fluid communication to the load spring and the lift actuator, wherein the gas kit is configured to provide pressurized gas to the second gas chamber to move the lift axle in the first direction from the lowered position to the raised position, wherein the gas kit is further configured to provide pressurized gas to the first gas chamber to move the lift axle in the second direction from the raised position to the lowered position, and wherein the conduit is configured to enable pressurized gas to flow from the second gas chamber to the first gas chamber as the lift axle is moving from the raised position to the lowered position.

7. A lift axle system comprising:
   a support structure configured to be fixedly attached to a vehicle frame;
   an axle movably coupled to the support structure, wherein the axle is configured to rotatably support one or more wheels on opposite end portions thereof, and wherein the axle is movable relative to the vehicle frame between a lowered position in which the wheels are in contact with the ground and a raised position in which the wheels are spaced apart from the ground;
   a load spring configured to be operably coupled between the axle and the vehicle frame, wherein the load spring includes a first chamber configured to contain pressurized gas to support at least a portion of a load on the vehicle frame;
   a lift actuator operably coupled between the support structure and the axle, wherein the lift actuator includes a second chamber configured to contain pressurized gas to raise the axle from the lowered position to the raised position; and
   a conduit operably connecting the first chamber in fluid communication with the second chamber, whereby pressurized gas flows between the first and second chambers via the conduit in response to movement of the axle in the lowered position.

8. The lift axle system of claim 7, further comprising a damping feature in fluid communication with the conduit, wherein the damping feature is configured to dampen the flow of the pressurized gas between the first chamber and the second chamber.

9. The lift axle system of claim 7, further comprising a flow restriction in fluid communication with the conduit, wherein the flow restriction is configured to dampen the flow of the pressurized gas between the first chamber and the second chamber.

10. The lift axle system of claim 7, further comprising a flow control valve in fluid communication with the conduit, wherein the flow control valve is configured to dampen the flow of the pressurized gas between the first chamber and the second chamber.

11. The lift axle system of claim 7 wherein the load spring is a first air spring and the lift actuator is a second air spring.

12. The lift axle system of claim 7 wherein the load spring is an air spring having one or more flexible bellows and the lift actuator is an air cylinder having one or more pistons therein.

13. An air kit for use with a lift axle, the lift axle including at least one load spring and at least one lift actuator, the air kit comprising:
- at least one valve, wherein the at least one valve is operable in a first state to provide pressurized air from a vehicle compressed air source to the lift actuator to move the lift axle from a lowered position to a raised position, and wherein the at least one valve is further operable in a second state to provide pressurized air from the vehicle compressed air source to the load spring to move the lift axle from the raised position to the lowered position; and
- an air flow path configured to be operably connected in fluid communication between the load spring and the lift actuator, wherein the air flow path is configured to enable the flow of pressurized air between the load spring and the lift actuator in response to movement of the lift axle.

14. The air kit of claim 13 wherein the air flow path includes at least one damping feature configured to dampen the flow of the pressurized air between the load spring and the lift actuator.

15. The air kit of claim 13 wherein the air flow path is configured to enable the flow of pressurized air between the load spring and the lift actuator in response to movement of the lift axle when the at least one valve is in the second state.

16. The air kit of claim 13 wherein the air flow path is configured to enable the flow of pressurized air between the load spring and the lift actuator in response to movement of the lift axle when the at least one valve is in the second state, but not when the at least one valve is in the first state.

17. The air kit of claim 13 wherein the at least one valve is a first valve, and wherein the air kit further comprises a second valve in fluid communication with the first valve, wherein the second valve is operable in a first state to provide pressurized air from the first valve to the lift actuator to raise the lift axle, and wherein the second valve is further operable in a second state to provide pressurized air from the lift actuator to the load spring via the air flow path.

18. The air kit of claim 13 wherein the air flow path is configured to enable the flow of pressurized air between the load spring and the lift actuator when the lift axle is in the lowered position, and wherein the air flow path is further configured to prevent the flow of pressurized air between the load spring and the lift actuator when the lift axle is in the raised position.

19. The air kit of claim 13, further comprising:
- the at least one load spring, wherein the at least one load spring includes a first air spring; and
- the at least one lift actuator, wherein the at least one lift actuator includes a second air spring.

* * * * *